June 22, 1965 J. W. WILKIE ETAL 3,190,159
CONTOUR SAWING MACHINE
Filed April 13, 1964 10 Sheets-Sheet 1

Inventors
James W. Wilkie
Charles E. Cleland

June 22, 1965    J. W. WILKIE ETAL    3,190,159
CONTOUR SAWING MACHINE
Filed April 13, 1964    10 Sheets-Sheet 2
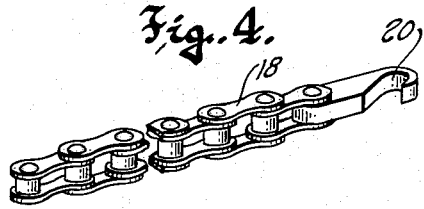
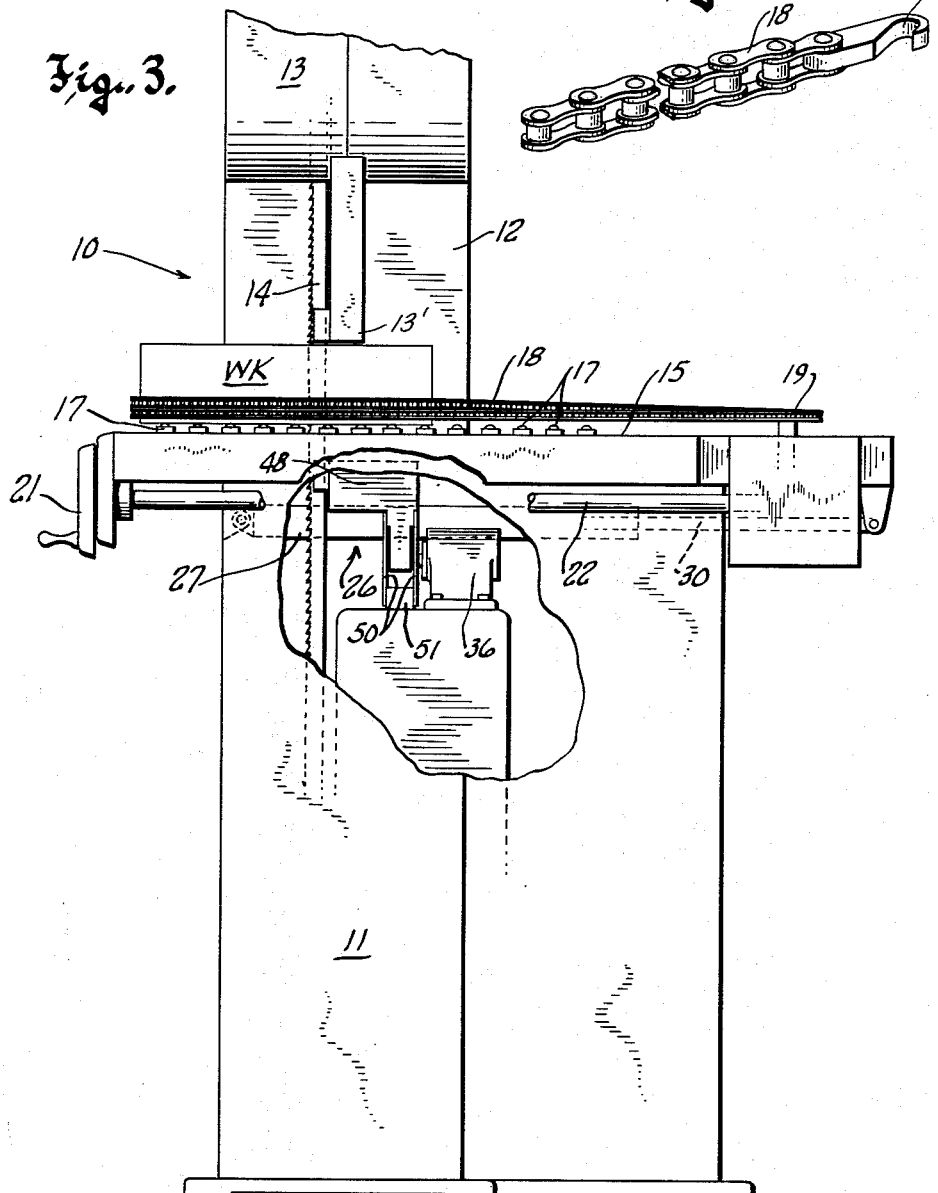
Inventors
James W. Wilkie
Charles E. Cleland

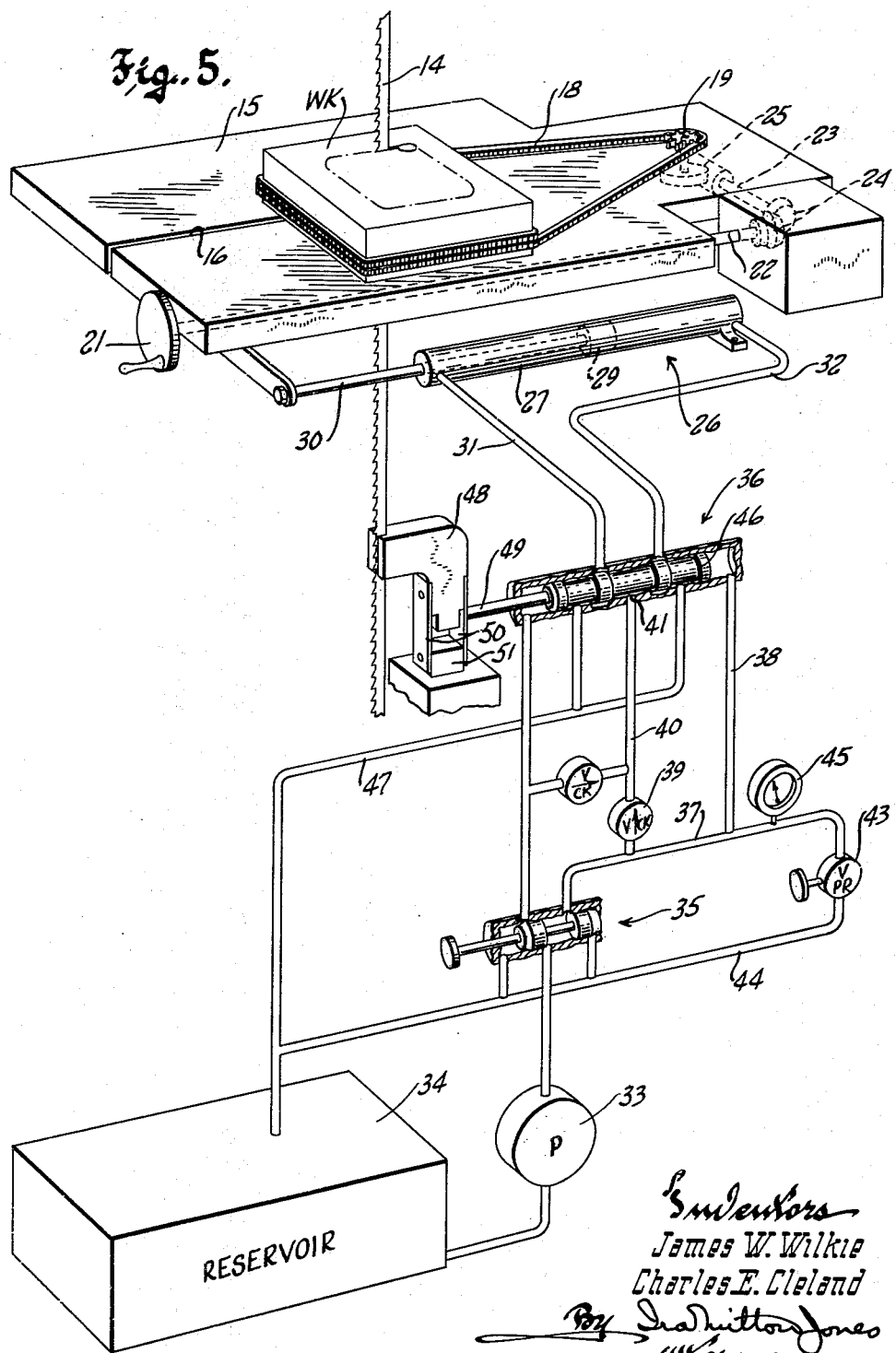

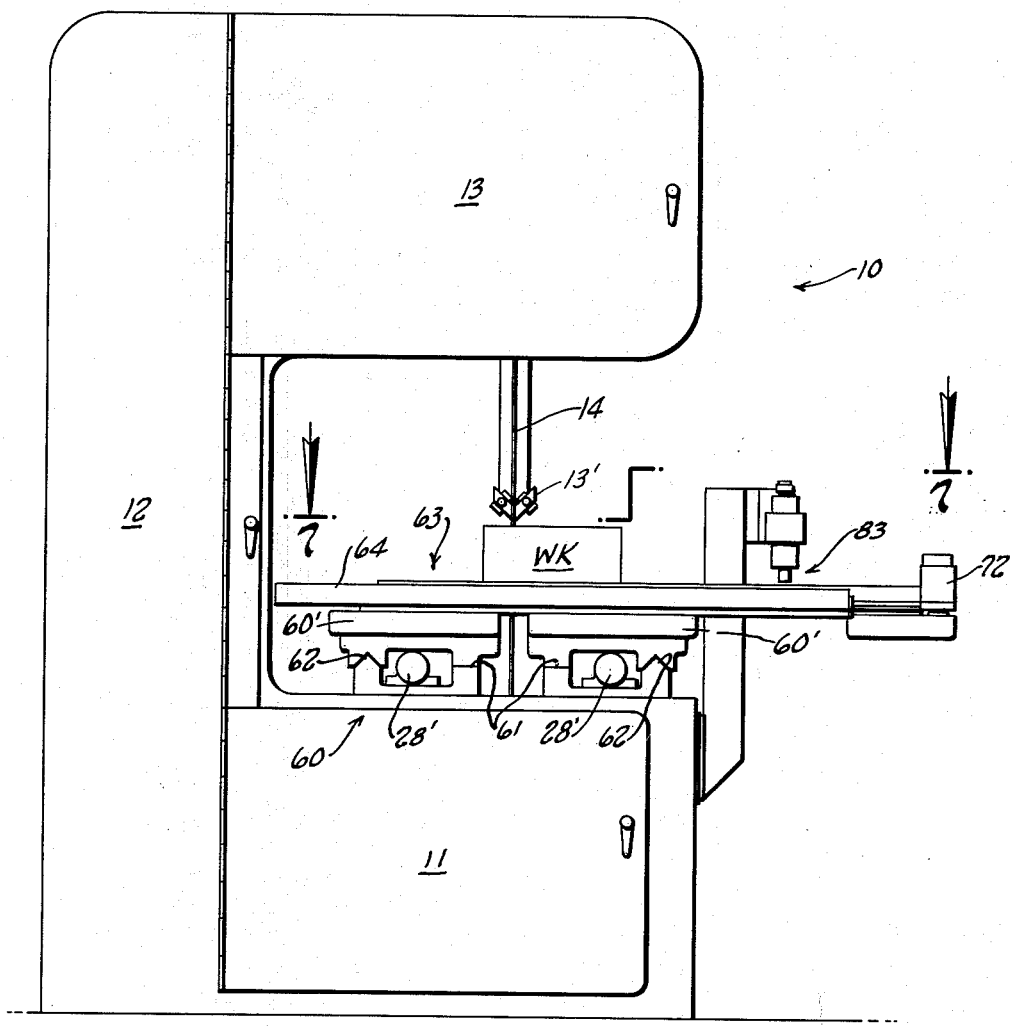

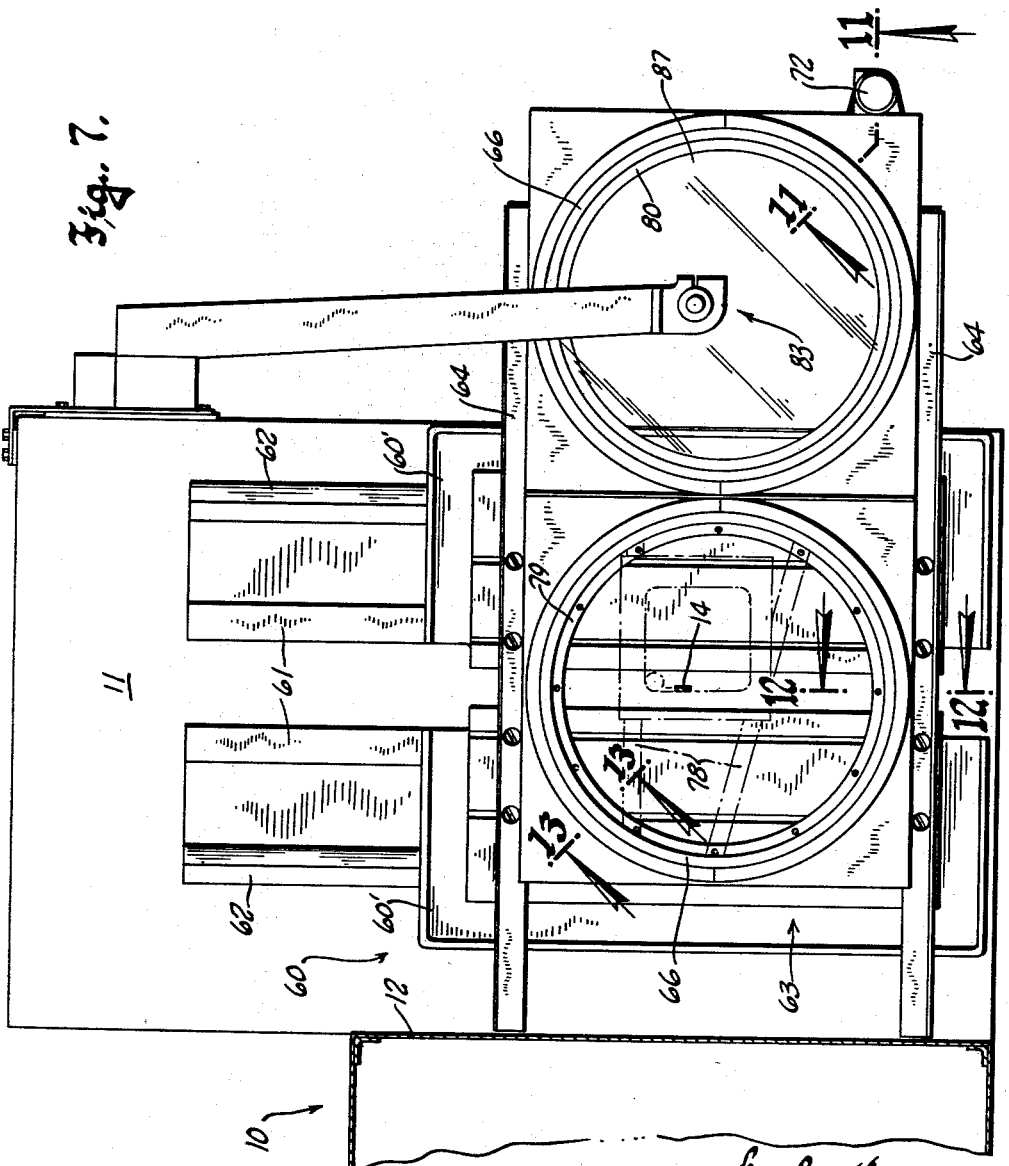

June 22, 1965  J. W. WILKIE ETAL  3,190,159
CONTOUR SAWING MACHINE

Filed April 13, 1964  10 Sheets-Sheet 6

Inventors
James W. Wilkie
Charles E. Cleland
By
Attorney

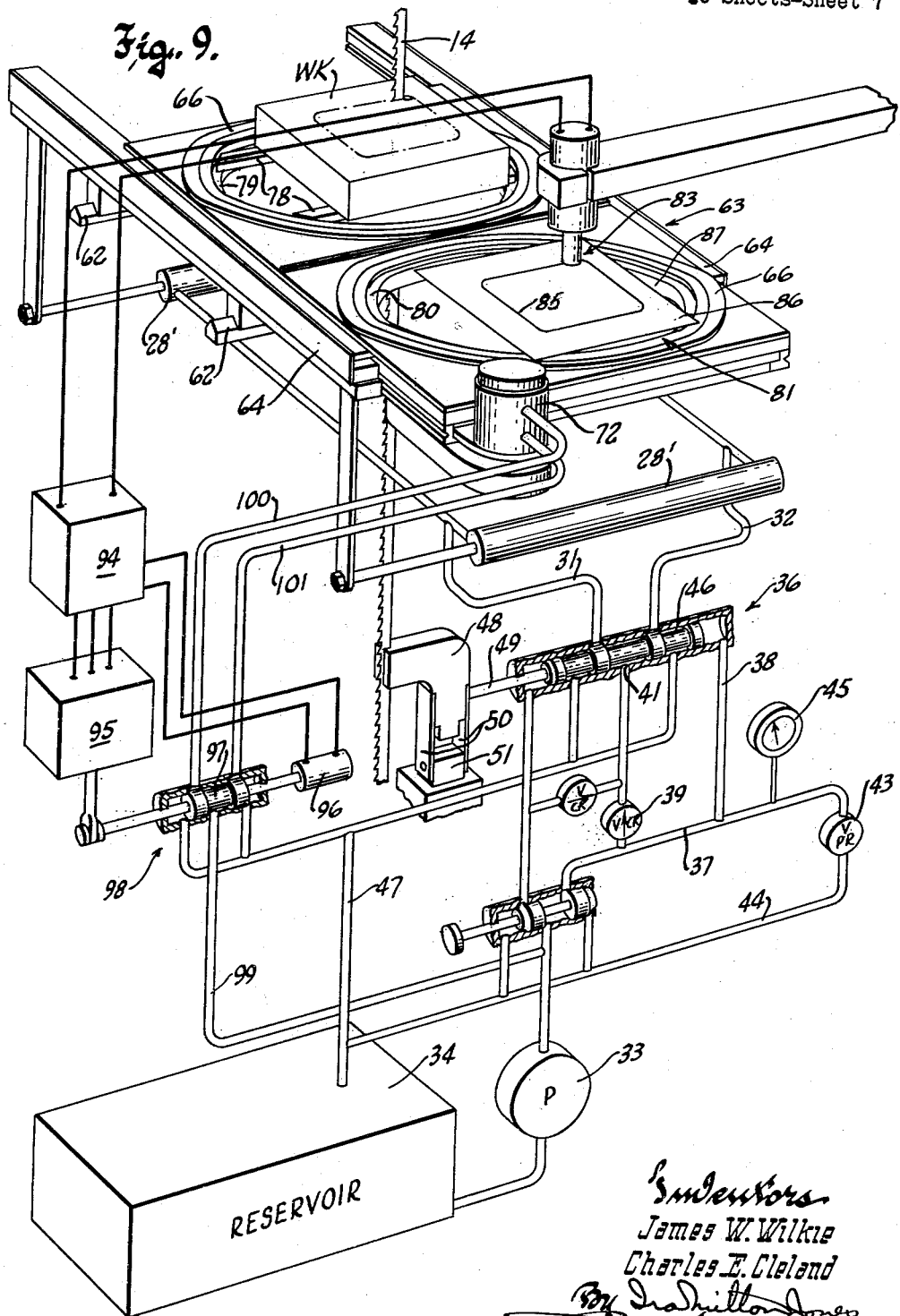

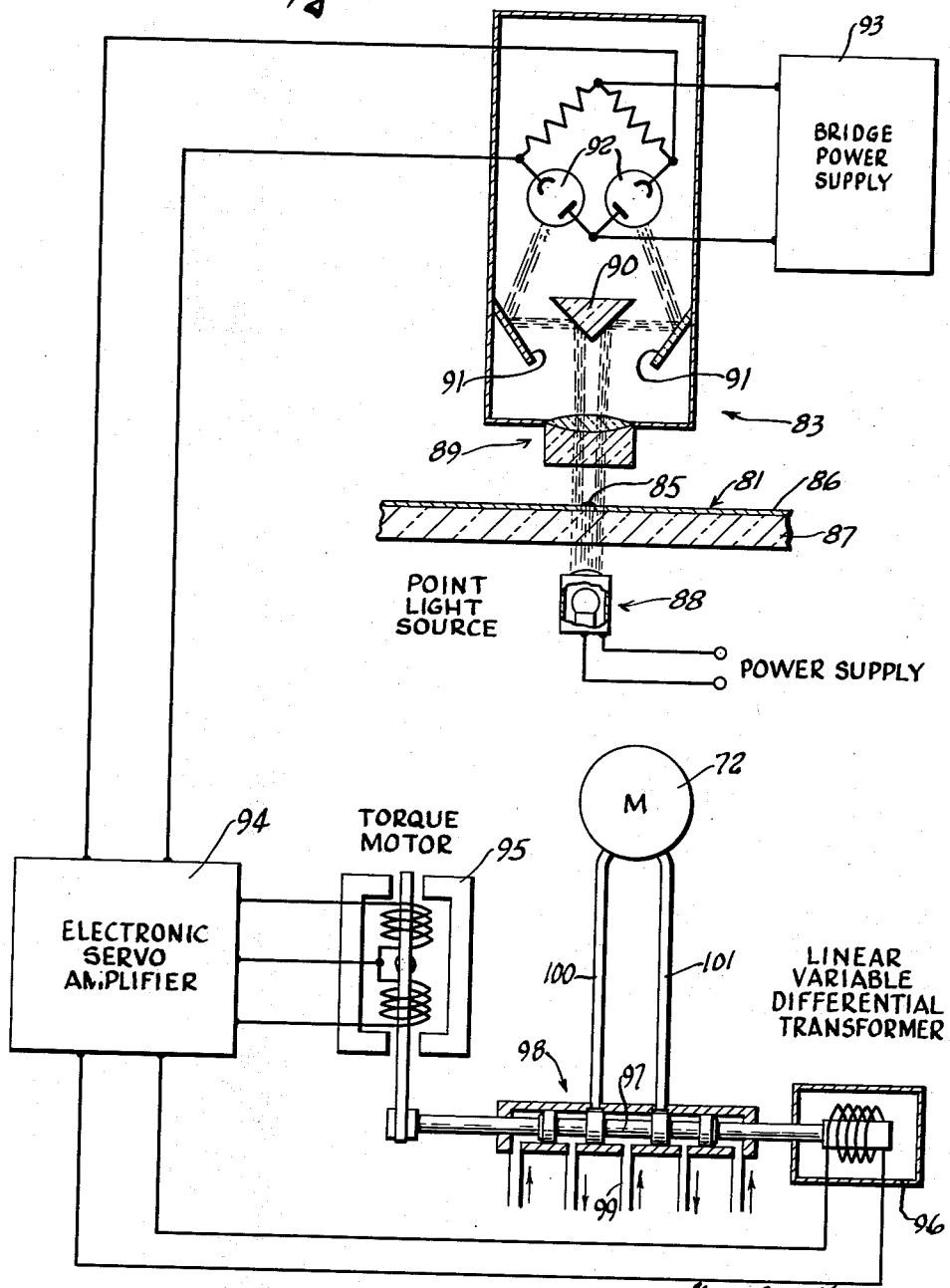

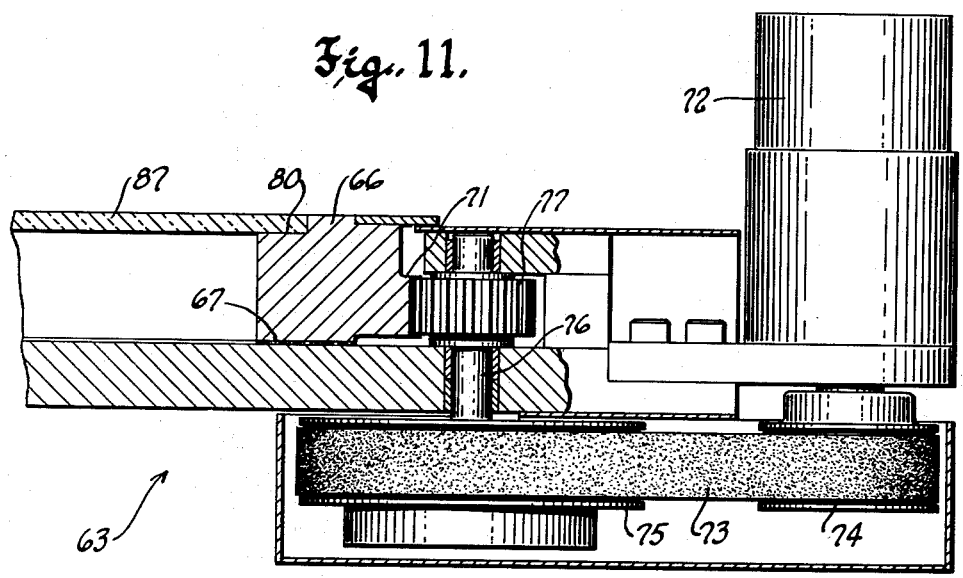
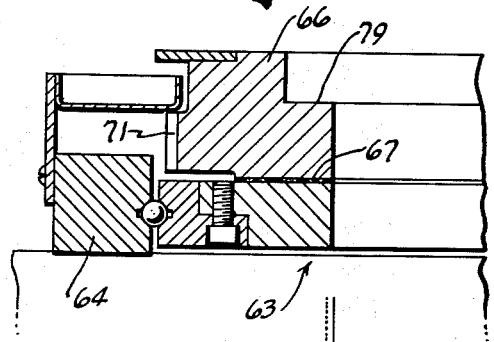
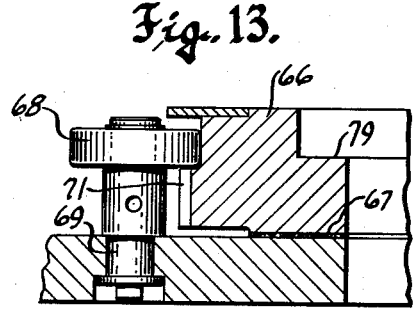
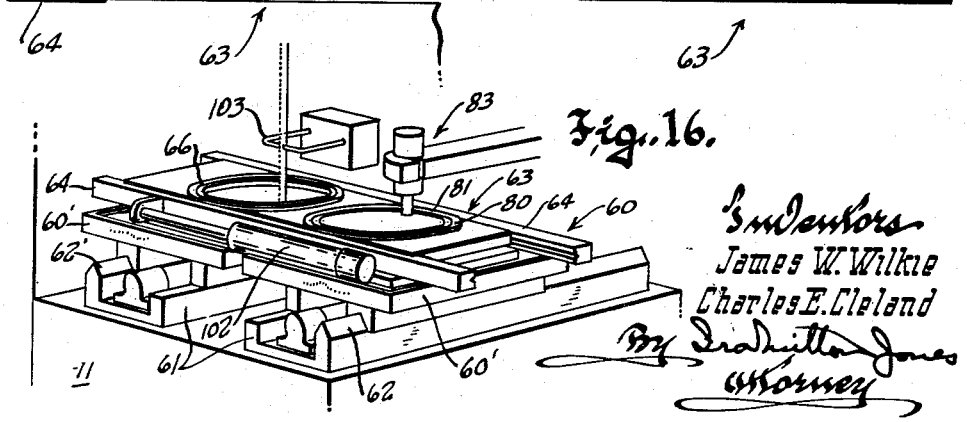

June 22, 1965  J. W. WILKIE ETAL  3,190,159
CONTOUR SAWING MACHINE
Filed April 13, 1964  10 Sheets—Sheet 10
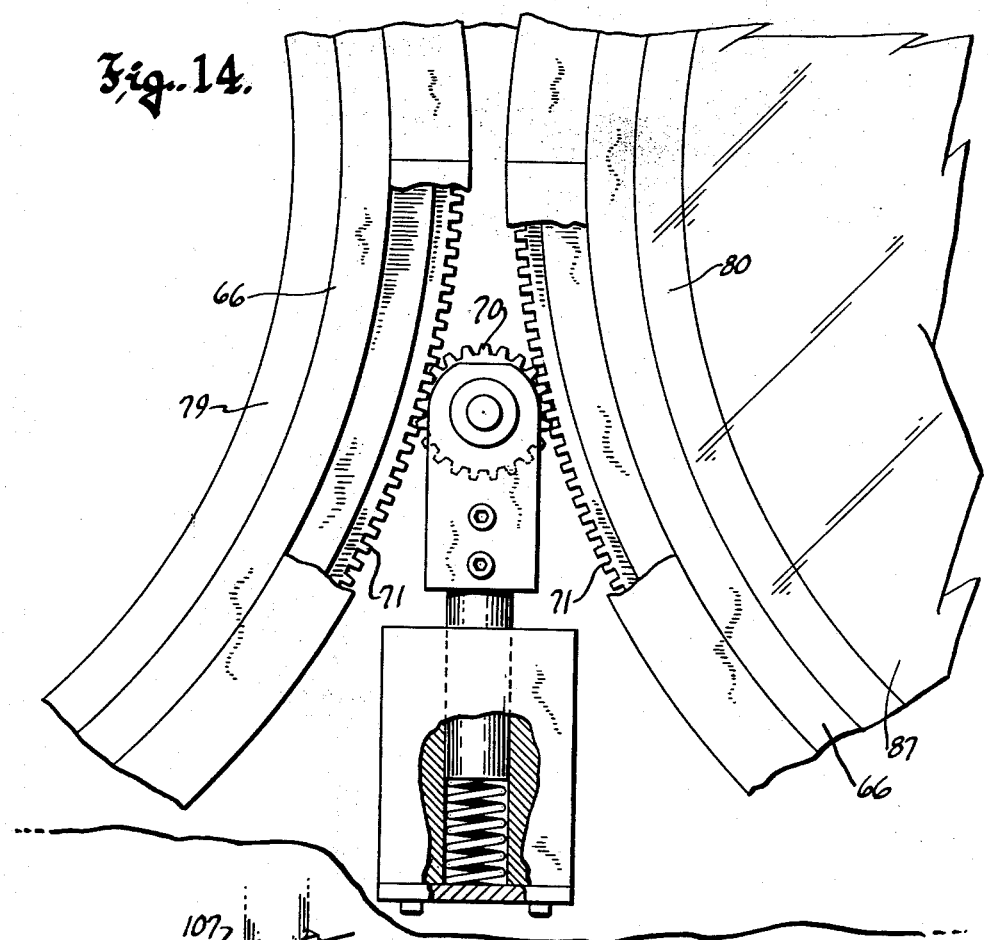
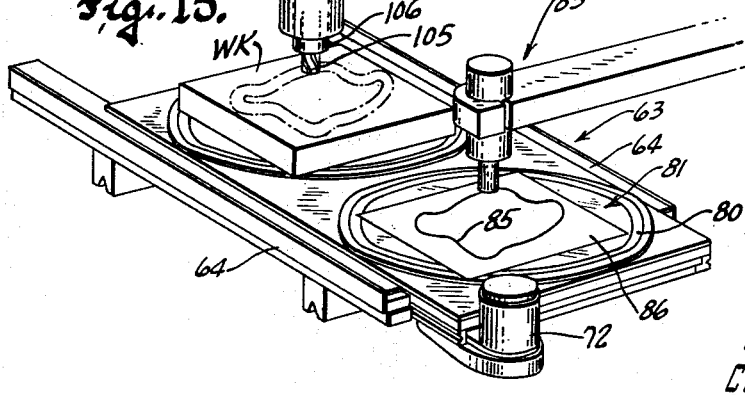
Inventors
James W. Wilkie
Charles E. Cleland

United States Patent Office 3,190,159
Patented June 22, 1965

3,190,159
CONTOUR SAWING MACHINE
James W. Wilkie, Hopkins, and Charles E. Cleland, Minneapolis, Minn., assignors to Continental Machines, Inc., Savage, Minn., a corporation of Minnesota
Filed Apr. 13, 1964, Ser. No. 359,216
16 Claims. (Cl. 83—56)

This invention relates to machine tools generally, and while particularly concerned with contour sawing machines, it is also applicable to end mills, and in fact any machine tool wherein a power driven tool operates in a defined zone and the work is power fed into work-performing engagement with the tool as required to produce a cut along an irregular line or path.

The primary objective and purpose of the invention is to provide a method and apparatus for feeding a workpiece to the tool of a contouring machine, such as a band saw or end mill, whereby a constant feed force is maintained regardless of how the workpiece is turned or shifted on its support in guiding the cutting action along its intended path.

More specifically, it is an object of this invention to provide a method and apparatus for feeding work to the tool of a contour sawing or cutting machine by power driven means automatically controlled by means sensitive to any tendency toward change in the reaction between the workpiece and the tool resulting from rotation of the workpiece as the cutting action proceeds, so that cutting at a predetermined constant rate can be effected along any contour line by simply controlling or effecting the rotary motion of the workpiece needed to have the cutting action take place along the given contour line or path.

Another object of this invention is to provide a method and apparatus for feeding work to the tool of a contour sawing or cutting machine which allows the entire feeding operation to be automated.

Still another object of this invention is to eliminate side thrust upon the cutting stretch of a bandsaw produced by the pressure of a workpiece thereagainst and resulting from the tendency of the workpiece to rotate about its center of gravity rather than an axis about which it should turn to cut along a given curved line or path; or, stated in another way, to provide a method and apparatus for feeding work to the cutting stretch of a contour sawing machine, whereby zero force or at least substantially zero force is maintained between the workpiece and the saw blade along an axis perpendicular to the flat sides of the saw blade, regardless of the direction and extent of any rotary motion imparted to the workpiece in guiding the cutting action along the prescribed path.

With the above and other objects in view which will appear as the description proceeds, this invention resides in the novel method and apparatus substantially as hereinafter described and more particularly defined by the appended claims, it being understood that such changes in the precise embodiment of the herein disclosed invention may be made as come within the scope of the claims.

The accompanying drawings illustrate several complete examples of the physical embodiment of the invention, constructed according to the best modes so far devised for the practical application of the principles thereof, and in which:

FIGURE 3 is a side view of the band saw illustrated in FIGURE 1, with parts thereof broken away;

FIGURE 4 is a detail perspective view of one end portion of the tension member or chain by which the workpiece is connected with the work supporting table in the machine of FIGURE 1;

FIGURE 5 is a diagrammatic view in perspective, illustrating the essential elements of the manually controlled work feeding and control system of the machine shown in FIGURE 1;

FIGURE 6 is a front elevational view of a band saw equipped with the fully automated version of this invention, wherein even the rotation of the workpiece is automatically effected by control instrumentalities governed by a sensing device which follows a trace or pattern line on a templet;

FIGURE 7 is a cross sectional view through FIGURE 6 on the plane of the line 7—7;

FIGURE 9 is a diagrammatic view in perspective, illustrating the essential elements of the work feeding and control system of the automatic machine;

FIGURE 10 is a diagrammatic illustration of a sensing device to govern the control system illustrated in FIGURE 9;

FIGURE 11 is a cross sectional view through FIGURE 7 on the plane of the line 11—11;

FIGURE 12 is a detail cross sectional view through FIGURE 7 on the plane of the line 12—12;

FIGURE 13 is a fragmentary cross sectional view through FIGURE 7 on the plane of the line 13—13;

FIGURE 14 is a fragmentary top plan view of a portion of the structure shown in FIGURE 7, illustrating the manner in which the work and templet supports are drivingly connected to turn in unison;

Figure 1:
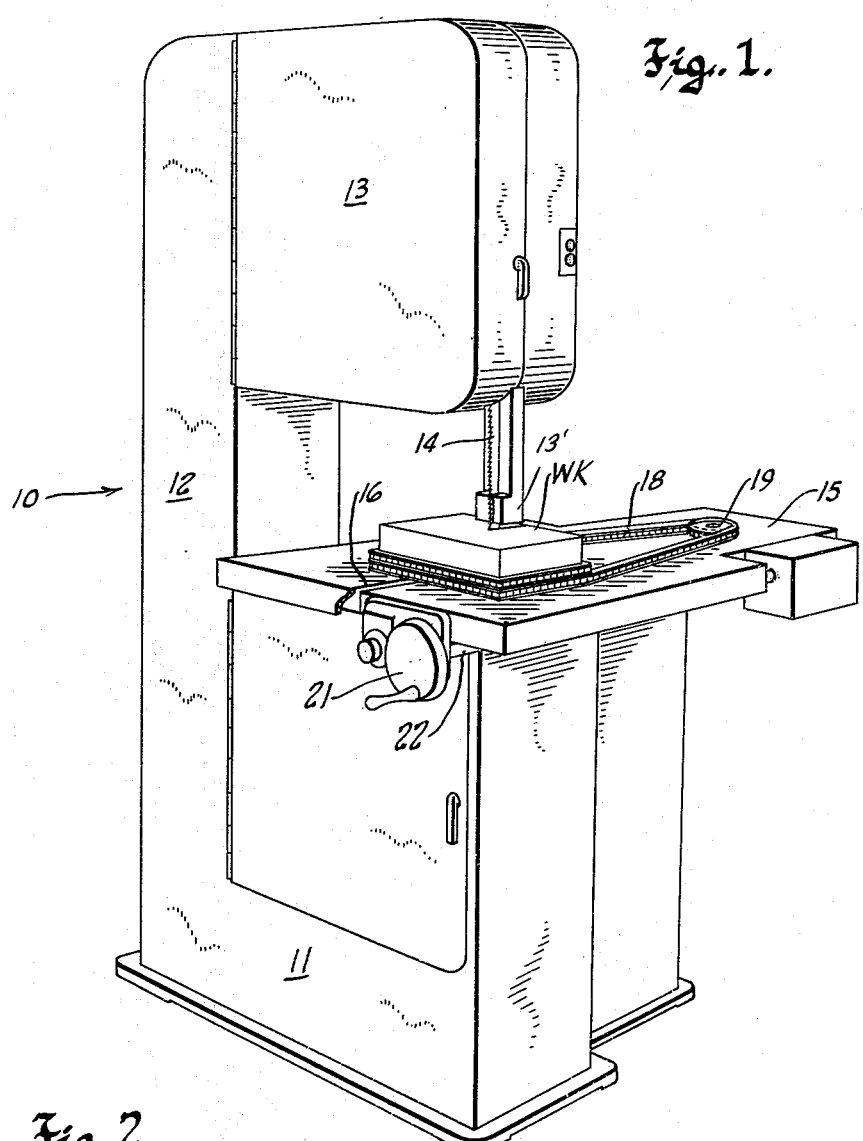
FIGURE 1 is a perspective view of a band saw equipped with a manually controlled version of this invention.

FIGURE 15 is a perspective view more or less diagrammatically illustrating an adaption of this invention to an end mill; and FIGURE 16 is a fragmentary detail perspective view of a portion of the automatic machine, more or less diagrammatically illustrating one way in which an optional power assist may be incorporated to assure the maintenance of zero force between the workpiece and the saw band in the lateral direction, i.e. in the direction perpendicular to the flat sides of the work-performing stretch of the saw band.

Before describing the embodiments of the invention illustrated herein, it would be well to point out that the most pertinent prior art approach to the problem of power-fed contour sawing is to be found in the patent to James W. Wilkie, No. 2,296,967. In the machine of that patent, the operator not only manually rotated the work as required to effect cutting along the desired contour line, but, in addition, had to manually control the feed force between the work and the saw blade. Although a weight suspended on tension members connected with the workpiece was provided in that machine to impart work feeding motion to the workpiece, the operator had to manually control the descent of the weight and, at times when the direction and path of the cut being made entailed retrograde motion of the workpiece, he had to actually lift the weight. This was all done by a treadle which the operator depressed with one foot. The operator, therefore, virtually had to stand on one foot, since with his other foot he controlled feed force. Needless to say, the machine of the aforesaid Wilkie patent had serious drawbacks and clearly could not be used for very heavy work.

By contrast, the present invention enables cutting along any irregular path with a constant power-produced feed force, by controlling only the rotation of the workpiece as required to have the cut follow the given contour line. This rotation of the workpiece, in one embodiment of the invention, is effected and controlled manually; in another, it is done automatically in accordance with a pattern or templet.

The invention is thus susceptible to being embodied either in a manually controlled machine or in a fully automatic machine; and while it is primarily concerned with band saws, it is also adaptable to an end mill, or in fact any machine in which the cutting tool operates in a fixed zone and the work is fed thereto as required to produce the desired cut.

Referring now to the drawings, in which like numerals designate like parts throughout the several views, whether the machine is intended for manually controlled contour sawing or fully automatic contour sawing, it has the usual C-shaped main frame, designated generally by the numeral 10, and comprising a base portion 11, a pedestal 12, and an upper arm 13. The frame houses the pulleys (not shown) about which a saw band 14 is trained, to have its work performing stretch travel downwardly in a vertical straight line across the throat of the C-shaped frame. The frame of the machine also houses the drive means by which the saw band is driven.

In the manually controlled embodiment of the invention, illustrated particularly in FIGURES 1–5, inclusive, the base 11 has a work carrying table 15 slidably mounted thereon and constrained by suitable ways to translatory motion along a horizontal axis which is parallel to the flat side faces of the saw band. The cutting or work performing stretch of the saw band 14, of course, passes downwardly through the table 15 and, to permit the table to slide forward and backward, a slot 16 is formed therein through which the saw band passes.

Figure 2:
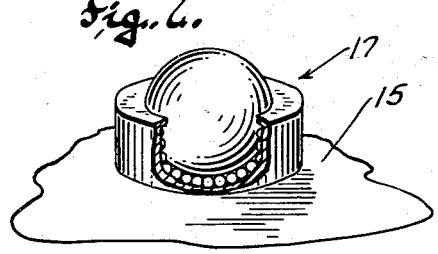
FIGURE 2 is a perspective view, with parts broken away, illustrating a detail of the machine shown in FIGURE 1.

The workpiece in which the cut is to be made, designated WK, sets upon the table; and to permit the workpiece to shift freely over the table in all directions, the table top is equipped with anti-friction means 17 which may consist of a plurality of ball-type casters set into the table, as illustrated in FIGURES 2 and 3, or a suitable lubricant may be applied to the table surface. The reason for having the workpiece freely slidable across the table in all directions is to eliminate side thrust upon the saw band which would result from the tendency of the workpiece to rotate about its center of gravity rather than the axis about which it should turn to saw along a curved line. Such side thrust would tend to bow the saw band and keep it from cutting in a straight vertical line.

Torque is applied to the workpiece to turn or rotate the same as required by means of a flexible tension member 18, which is preferably a sprocket chain. The chain is wrapped about the workpiece and trained over a sprocket wheel 19 mounted on and hence movable with the table 15. The location of the sprocket wheel on the table is important. It is located at that portion of the table farthest removed from the operator's station, and hence is beyond the back edge of the saw so that as the table advances, the sprocket wheel moves away from the saw. Moreover, the vertical axis about which the sprocket turns lies in a plane that contains the work performing stretch of the saw band and is parallel to its flat sides.

In applying the tension member or chain 18, it is wrapped completely around the workpiece with the workpiece in a position determined by the location of the start of the cut, and then after the claim is pulled taut, a hook 20 on one end thereof is hooked onto the adjacent link of the other end portion of the chain. With this connection completed, forward feeding motion of the table will take up any remaining slack in the chain and draw taut its two stretches which extend tangentially from the sprocket 19 to opposite sides of the workpiece, and pull the workpiece against the cutting edge of the saw.

As long as a straight line cut is being made, the workpiece simply moves ahead in unison with the table, since for such a cut there is no need for relative motion between the workpiece and the table, except such rotation of the workpiece about the edge of the saw band as might be necessary to correct for any tendency of the saw to wander to one side or the other of the straight line along which the cut is to be made. Any such adjustment of the workpiece is easily effected by rotating the sprocket 19 to apply tension on one or the other of the two divergent stretches of the tension member or chain. Any such needed rotation may be imparted to the sprocket wheel by turning a hand wheel 21.

The hand wheel 21 is conveniently located at the front of the machine and is drivingly connected with the sprocket wheel 19 through a shaft 22 extending lengthwise of the table, a cross shaft 23 geared to the shaft 22 through a pair of bevel gears 24, and a worm and worm-wheel connection 25 between the cross shaft and the shaft of the sprocket wheel.

Since the axis of the sprocket wheel 19 lies in the plane of the saw blade, equal turning moments are maintained on the workpiece and the system is in a state of equilibrium as long as the sprocket 19 is not turned, no matter where the cut is located transversely of the workpiece—or, in other words, regardless how far the points of "tangency" of the two stretches of the tension member with the workpiece may be from the cutting edge of the saw.

This equilibrium results from the fact that the product of the effective pull on the workpiece applied through one stretch of the tension member times the leverage of that stretch (perpendicular distance between said stretch of the tension member and the edge of the saw band) is always equal to the product of the effective pull applied on the workpiece through the other stretch of the tension member times its leverage.

It should be noted, though, that this equilibrium or maintenance of equal turning moments on the workpiece regardless of any difference in the distances from the points of "tangency" between the workpiece and the two stretches of the tension member to the cutting edge of the saw, as long as no change is being made in the pull on the two stretches of the tension member, is disclosed in the aforesaid Wilkie Patent No. 2,296,967. What that patent does not disclose, and what the machine covered thereby lacks, has to do with the manner in which feed pressure is produced and maintained automatically at a constant value, regardless of how the workpiece is rotated and/or moved about on the table in negotiating an irregular contour line. The attainment of this result is one of the objectives of the present invention.

An essential to the attainment of the objectives of this invention is a controllable variable speed reversible power source, indicated generally by the numeral 26, connected with the table 15 to produce or effect translation of the table and the workpiece thereon along the axis of motion to which the table is constrained, and which axis will hereinafter be referred to as—first axis. Movement of the workpiece along this first axis, and only this axis, results in a straight line cut, providing of course that the saw does not wander to one side or the other. To cut along an irregular contour line, or along straight lines which are at angles to one another—as, for instance, the sides of a square, or to cut around a circle as in cutting a circular hole in a workpiece—motion of the workpiece with respect to the table is necessary. This additional motion of the workpiece is along a second axis which is transverse to the first axis, and about a third axis which is parallel to the cutting edge of the saw band. It would be well, therefore, to continually bear in mind that to accomplish contour sawing, the workpiece must be movable in either direction along a first axis which is parallel to the side faces of the saw band; it must be movable in either direction along a second axis which is normal to the side faces of the saw band (and hence at right angles to the first axis); and it must be rotatable about a third axis which is parallel to the cutting edge of the saw band and hence perpendicular to the plane defined by the intersecting first and second axes.

Motion of the workpiece along the first axis is produced either by the power source 26 alone, or by the power source 26 in combination with rotation of the workpiece about the third axis produced by turning the hand wheel 21. Motion along the second axis is automatically produced by the side thrust reaction between the workpiece and the saw blade, and is made possible by the freedom of the workpiece to slide across the work table. This freedom, of course, results from having the anti-friction means 17 interposed between the table and the workpiece.

Because of the freedom of the workpiece to slide across the table, the force existing between the workpiece and the saw band along the second axis is always substantially zero; and accordingly there is no significant force on the saw band tending to bow it to one side or the other, which would be the case if the workpiece could not slide freely across the table and instead would tend to rotate about its own center of gravity in response to the application of torque thereon, rather than about the axis it should turn to cut along a given curved line. Very seldom, if ever, does the center of gravity of the workpiece coincide with the axis about which it must be turned to saw along a curved line.

The controllable, variable speed, reversible power source 26 may be of any suitable type but, in the present machine, it is a hydraulic motor 27 having a cylinder fixed to the stationary structure of the machine and a piston 29 movable in the cylinder and connected by means of a rod 30 with an arm fixed to the table. Hydraulic fluid under pressure may be admitted to or leave from either end of the cylinder through lines 31 and 32.

Fluid pressure is derived from a pump 33 which has its inlet connected to a reservoir 34 and its outlet connected with a manually operable selector valve 35. This selector valve determines the direction of the motion produced by the hydraulic motor 27 when the pump is running. With the selector valve in its position shown in FIGURE 5, fluid under pressure flows (as soon as the pump is started) from the valve 35 to the closed end (right-hand) of a servo valve 36, through lines 37 and 38. Pressurized fluid will also flow through a check valve 39 and line 40 to an inlet port 41 in the servo valve 36.

The magnitude of the pressure in the system and hence at the servo valve, depends upon the setting of an adjustable pressure relief valve 43 which is connected in a return line 44 leading from the line 37 to the reservoir. The adjustment of this relief valve thus also determines the force with which the hydraulic motor 27 feeds the workpiece against the edge of the saw band, and preferably a gage 45 is connected in the return line 44 ahead of the adjustable pressure relief valve to show the feed pressure.

As soon as pressure is available in the system, and assuming the selector valve 35 to be in the position illustrated, the fluid pressure in the closed end of the servo valve shifts its spool 46 to the left and, in so doing, establishes communication between the inlet port 41 and a service port of the servo valve with which the line 31 is connected. This connects line 31 with the pressure source and line 32 with the reservoir through one of the exhaust ports of the servo valve and a return line 47. The hydraulic motor 27 thus operates to impart motion to the table 15 in the forward or feeding direction, i.e. to the right in FIGURE 5. The rate at which this forward or feeding motion takes place depends upon the extent the spool 46 has been shifted to the left, and if the spool is shifted in the opposite direction past a midpoint at which the pressure at opposite sides of the piston 29 is in balance, the connections to the motor 27 are reversed and the table is retracted.

The shifting of the spool 46 produced by pressure in the closed end of the servo valve, besides allowing pressure fluid to reach the line 31, also exerts pressure upon a sensing element 48 through a stem 49. This sensing element is operatively connected with the saw band as by simply bearing against its rear, smooth edge, to feel or sense any deviation in the position of the saw band caused by the thrust of the work against it, and produce corresponding changes in location of the spool 46. To enable the sensing element 48 to "float" with the saw band, it is mounted on the free ends of a pair of spring blades 50 that extend from a fixed support 51 mounted in any suitable manner upon the stationary structure of the machine.

As will no doubt be apparent, through the interpositioning of the sensing element 48 between the back edge of the saw band and the spool 46, the fluid pressure behind the spool urges the band towards the work with a known force which is determined by adjustment of the valve 43. This force is of course opposed by the thrust of the work against the saw band and through it upon the sensing element 48, so that location of the spool 46 which moves directly with the sensing element, varies with changes in the relative magnitude of these opposing forces.

But there is another force which acts upon the sensing element and thus has a bearing upon the position of the spool 46, and this force is variable. It is the spring force derived from flexure of the blades 50 and the bowing of the saw band itself. As is well known, the saw band of a band sawing machine is supported against the thrust of the work thereon by backups, usually in the form of free running solidly supported rollers above and below the work zone. The upper one of these backups, indicated by the numeral 13', is vertically adjustably carried by the upper arm 13 of the machine; the lower backup in this case is also the sensing element 48.

The stretch of the saw band between these backups being the working portion or stretch of the band, is inevitably bowed by the thrust of the work thereon. Because of the resilience of the saw band, the bowing thereof produces a reaction force which tends to restore the working stretch of the band to its normal straight condition. This reaction or restoration force is, of course, proportional to the degree of bowing that has taken place. The spring blades 50 when deflected by the thrust of the work against the saw band, also react against that thrust with a force that is proportional to the extent the band is bowed. Thus the restoration forces inherent in the saw band and in the spring blades 50 together augment the known force supplied by the fluid pressure acting on the spool; and since these augmenting forces vary with the degree of bowing of the band, they have a variable effect upon the position of the sensing element and the spool 46 and thereby give the servo valve its intended proportioning effect.

Stated in another way, the net force reacting against the thrust of the work on the saw band varies with changes in the location of the working portion or stretch of the band, and hence the sensing element 48 in detecting and following those changes proportionally adjusts the position of the servo valve spool. As long as all of these forces coact to hold the spool 46 in a position at which it admits fluid to the line 31, the hydraulic motor 27 will produce movement of the table and the workpiece on it, in the feeding direction along the first axis, and cutting will take place at a constant rate determined by the setting of the adjustable relief valve 44.

However, when the workpiece is rotated or turned on the table, as required to cut along an irregular or curved contour line, this motion of the workpiece with respect to the table will either add to or subtract from the feed force between the workpiece and the saw band produced by the power source 26. If the result of such rotation of the workpiece is additive with respect to the feed force, it follows that the advance of the table must be slowed down if a constant feed force is to be maintained; and, conversely, if the effect of such rotation of the workpiece is to subtract from the feed force, the table must move faster to maintain a constant feed force. The effect of rotation of the workpiece thus is always along the first axis.

How rotation of the workpiece affects the rate at which the table 15 travels will be readily understood if one considers what takes place in making a circular cut in a workpiece. Obviously, this requires rotation of the workpiece about an axis which coincides with the center of the circle and further requires this axis to remain in a fixed location wtih respect to the cutting edge of the saw; and this means that the table 15 must remain stationary. The entire feed force must then be derived from the rotation of the workpiece which is produced by turning the hand wheel 21.

For all this to occur, the additive or subtractive effect of the rotation of the workpiece upon the feed force, as felt by the sensing element 48 must bring the spool 46 of the servo valve to its position at which it causes equal effective pressures to be manifested at the opposite sides of the piston 29.

The power source 26, being governed by the sensing element 48, thus at all times moves the table 15 at the rate (which may be zero) and in the direction required to maintain a constant feed force. This makes it possible to cut along any contour line—regardless of its irregularity—at the constant rate set by the adjustable relief valve 43, by controlling only the rotation of the workpiece. In other words, by controlling only one of the three motions involved in properly feeding a workpiece to the saw, cutting along any contour line or path at the desired constant rate is accomplished.

In the manually controlled machine thus far described, rotation of the workpiece and control thereof is, of course, accomplished manually by turning the hand wheel 21. In the fully automatic machine illustrated in FIGURES 6-14, rotation is imparted to the workpiece by power means automatically governed by control instrumentalities including a pattern or templet follower or tracer.

The main frame, saw band and driving means for the saw band are present in the automatic machine as they were in the manually controlled machine; but, in the automatic machine, the counterpart of the work supporting table 15 is a primary carriage means 60 consisting of two complementary carriage sections 60', one on each side of the saw band. These carriage sections are slideably mounted on ways 61 and 62, the latter constraining the carriage sections to translation along the first axis. The controllable variable speed reversible power source by which the primary carriage means is slid back and forth along the first axis comprises two hydraulic motors 28' one for each carriage section 60', but acting in unison to move both sections simultaneously.

Mounted on the complementary carriage sections 60', i.e. the primary carriage means, is a secondary carriage means 63. This secondary carriage means may be simply a metal plate, as suggested in FIGURE 8, or it may be a built-up frame structure. In any event, it is slideably mounted on the primary carriage means for translation along the second axis. Any suitable means may be employed to so mount the secondary carriage means, a convenient structure for this purpose consisting of a pair of rails 64 bolted to and thus tying together the two carriage sections 60', with the plate-like secondary carriage means 63 positioned therebetween and slideably supported by ball bearings or other similar anti-friction means running in tracks formed in the contiguous edges of the rails 64 and the carriage 63.

Figure 8:
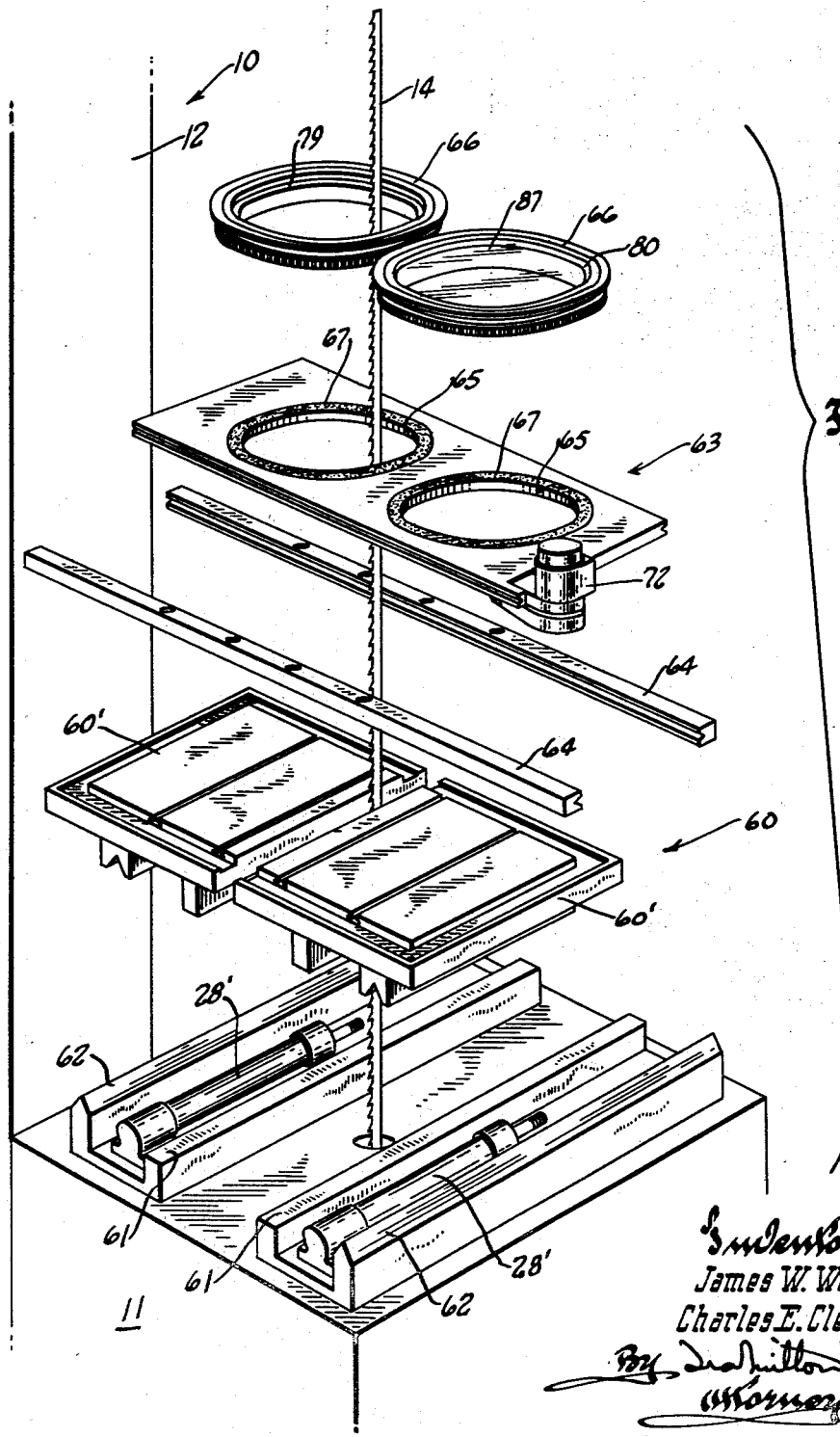
FIGURE 8 is an exploded perspective view of the mechanical elements of the work and templet supporting structures of the automated version of the invention.

If the secondary carriage 63 is simply a metal plate, as shown in FIGURE 8, it has two relatively large round holes 65 therein, through one of which the saw band passes, and freely rotatably mounted on the secondary carriage 63 are two turrets 66, one in line with each of the holes 65. These turrets are essentially hollow rings, and as shown in FIGURES 11-13, may rest directly on the top face of the carriage 63, preferably with a layer 67 of Teflon or other similar anti-friction material interposed therebetween, so that the rings may be freely rotated. A plurality of free-running rollers 68 journalled on studs 69 coact to constrain the turrets to rotation. Preferably the studs 69 are eccentrically secured in holes in the plate-like carriage 63, to permit their respective rollers to be adjusted toward and from the rings as needed to center the turrets with the holes 65.

The two turrets are connected to rotate in unison, by means of an idler pinion 70 meshing with ring gears 71 on the turrets, the idler pinion 70 being spring biased into engagement with the ring gears, as best seen in FIGURE 14. A controllable, variable speed reversible drive motor 72 mounted on the secondary carriage 63 is drivingly connected with one of the turrets, as by means of a belt 73 trained about a drive pulley 74 on the motor shaft, and a pulley 75 fixed to a stub shaft 76 which is journalled in the carriage 63 and has a pinion 77 fixed thereto to mesh with the ring gear 71 of the adjacent turret.

The turret through which the saw band passes should be considered the master, and the other the slave turret. The master turret has a plurality of slats or bars 78 detachably secured to a ledge 79 on the inner edge of the turret to support the workpiece WK which may be bolted to these slats or bars, it being understood that the slats or bars are so located and oriented with respect to the path of the cut to be made that they do not interfere with the cutting action. In other words, the work supporting slats or bars should not be so placed that they extend across the line or path of the cut, and to enable them to be placed where they should be, the master turret has a circular series of tapped holes in its slat supporting ledge 79 and the slats are of different lengths.

The slave turret also has a ledge 80 on its inner edge, the purpose of which is to support a templet, indicated generally by the numeral 81. The templet has the contour of the cut to be made delineated thereon in any suitable manner, and coacts with a follower or tracer, indicated generally by the numeral 83, which acts through suitable control instrumentalities to govern the operation of the drive motor 72 and thereby produce rotation of the work supporting master turret and the workpiece thereon, as required to cut along the given contour line.

Although the templet follower 83 may be of any conventional type, the one shown in the drawings for purposes of illustration is like that of Patent No. 2,989,639, and hence operates on the light-sensitive cell principle. The templet thus may consist simply of a pencil or ink line 85 delineating the contour on a sheet of paper 86 suitably attached to a transparent glass plate 87 which is supported on the ledge 80. The follower 83 and a light source 88 of the type to produce a concentrated beam of light, are mounted on the stationary structure of the machine in fixed vertical alignment, respectively above and below the glass plate. The light source is arranged to direct its light beam upwardly onto the contour line and, through a magnifying lens system 89, onto a prism 90 mounted in the head of the follower 83. As long as the contour line passes through the light beam, the prism 90 splits the image of the line and directs the partial images in horizontally opposite directions onto reflecting surfaces 91, so oriented that the images projected thereby impinge upon a pair of photo-electric cells 92 also mounted in the head of the follower.

The cells 92 are connected in a bridge circuit and control electric power fed from a bridge power supply 93 to an electronic servo amplifier 94, the output of which is connected to a torque motor 95. The torque motor in conjunction with a linear variable differential transformer 96 which provides a feed back into the amplifier 94, controls the position of the spool 97 of a servo valve 98, shifting the same one way or the other depending upon which of the cells 92 is activated; and this in turn depends upon the relationship between the images of the contour line reflected by the prism. Thus, any misalignment between the light beam and the contour line to make one of the split images of the line heavier than the other, will bring about a corrective adjustment of the spool 97 and this, in turn, governs the operation of the hydraulic motor 72, since the servo valve 98 controls the connection of the motor with the fluid pressure source. To this end, the servo valve 98 has its inlet port connected with the pump through line 99, its exhaust ports connected with the reservoir through the return line 47, and its service ports connected with the motor through lines 100 and 101.

As long as the light beam from the light source 88 straddles the contour line, the spool of the servo valve 98 is in its mid-position at which it equally connects both motor or service ports of the valve with the pressure source, and as a result the motor 72 is idle. However, the instant the light beam no longer straddles the contour line, the consequent imbalance in the bridge circuit of the follower 83 brings about a corrective actuation of the motor 72 to turn or rotate the templet-carrying slave turret with respect to the stationary structure of the machine and, with it, the work carrying turret and the workpiece thereon. The motor 72, operating at the dictation of the templet follower, thus does just what the operator would do in the manually controlled version of the invention—turn or rotate the workpiece to present the same to the saw band, as required to cut along the prescribed path; and in so doing it modifies the component of the feed force provided by the hydraulic motors 28' to maintain the feed force constant. This latter result is, of course, achieved in the same way it was in the manually operated machine, i.e. by sensing the deflection of the saw band, with the sensing means 48 and shifting the position of the spool 46 of the servo valve 36 accordingly.

In the automated version of the invention just described, as in the manually controlled machine, side thrust reaction between the saw band and the workpiece is relied upon to shift the secondary carriage means one way or the other, as needed to maintain substantially zero force between the workpiece and the saw band along the second axis. For this to be possible, the mounting for the secondary carriage must be as frictionless as possible. Ordinarily, the attainment of the necessary freedom of motion in the mounting of the secondary carriage means presents no problem, but in very large capacity machines designed to handle extremely heavy workpieces, even the finest anti-friction type slides would not permit these lateral forces to be kept near enough to zero to assure fully satisfactory operation. In such cases, it would be desirable to provide a power assist for the secondary carriage means, controlled by a sensing device responsive to the slightest lateral deflection of the saw blade and operable at the dictation of that sensing device to impart the needed motion to the secondary carriage means. It should be understood, though, that this power assist is in no way tied into or coordinated with the power means by which motion is produced along the first axis.

This power assist may be of any suitable type, but a fluid motor, such as the hydraulic cylinder 102 shown in FIGURE 16, may be best suited to the purpose. The cylinder is mounted on the primary carriage means 60 and its piston is connected to the secondary carriage means 63. Hence, by supplying fluid pressure to the cylinder as directed by a sensing means 103 which detects any lateral deflection of the work performing stretch of the saw blade and which governs the functioning of a hydraulic control system (not shown) that is operatively connected with the cylinder and the fluid pressure source of the machine, the secondary carriage means will be shifted as needed to maintain zero or substantially zero force between the workpiece and the saw blade along the second axis.

Although the invention is primarily concerned with contour sawing, it may be used to advantage in an end mill or similar machine tool, as shown for instance in FIGURE 15. In this case, the same multiple carriage and turret structure used in the automatic version of the band saw may be employed; but since the work performing tool is a rotating cutter 105, another form of sensing means must be provided to feel or sense the feed pressure.

For purposes of illustration, the cutter 105 has been illustrated as being secured to a power driven spindle 106 which is journalled in a post 107. This post, like the arm that carries the templet follower 83, is fixed to the stationary structure of the machine. To feel or sense the feed pressure, a strain gage 108 may be mounted on the post to be responsive to the deflection of the post which inevitably results from variations in feed pressure. The output of the strain gage, acting through appropriate instrumentalities (not shown) governs the power source (the hydraulic motor 28' not shown in FIGURE 15) by which the multiple carriage structure is moved along the first axis. The instrumentalities by which the output of the strain gage effects its control over the power source may be like those shown in the Crane Patent No. 2,754,567.

Due to the torque reaction between the rotating cutter and the workpiece, the end mill embodiment of the invention introduces a need for correction which is not encountered in the band saw. In order to cut along a straight line path which, in the band saw would require only a straight feed motion along the first axis, the workpiece being fed to the rotating cutter of an end mill must be crabbed, as in the case of a flying aeroplane which encounters a cross wind. This crabbing of the workpiece is accomplished automatically by imparting rotation to the workpiece about the third axis in consequence of the continual tendency of the contour line on the templet to move out of alignment with the light beam because of the torque reaction between the rotating cutter and the workpiece.

While the foregoing description and the accompanying drawings describe the invention in terms of specific structure or apparatus, other devices might be employed to practice the invention. Thus, in its broadest aspect, the invention resides in a new and novel method of feeding a workpiece to a cutting tool such as a band saw or end mill, wherein the cutting action takes place along a fixed, relatively narrow straight cutting zone. This new feeding method comprises the following steps or acts:

(A) By means of a controllable variable speed reversible power source, moving the workpiece along a first axis that is normal to the fixed cutting zone to bring the workpiece into work-performing engagement with a cutting tool and produce a known force between the workpiece and the cutting tool along that first axis;

(B) So supporting the workpiece that it may move freely in either direction along a second axis which transversely intersects the first axis and likewise is normal to the fixed cutting zone so that zero force exists at all times between the workpiece and the tool along this second axis;

(C) Rotating the workpiece about a third axis which is perpendicular to the plane defined by the intersecting first and second axes, and hence parallel to the fixed cutting zone, as needed to effect the cutting action along a given contour line;

(D) By the rotation of the workpiece about the third axis producing a force between the workpiece and the tool along the first axis, the effect of which is to either add to or subtract from the known force between the workpiece and the tool along the first axis;

(E) Sensing any change from the known force between the workpiece and the tool along the first axis; and (F) By means responsive to the sensed changes in the force between the workpiece and the tool along the first axis, automatically controlling the power source to maintain the force between the workpiece and the tool along the first axis constant.

The manner in which the foregoing sequence of steps or acts may be performed by the apparatus illustrated and previously described, and by any other suitable apparatus, will undoubtedly be clear to those skilled in the art. It will also be apparent that this invention achieves a result long sought in contour machining, and particularly contour band sawing, since it makes it possible to cut at a predetermined constant rate along any contour line by controlling only one of the motions required to properly feed the work to the tool—namely, rotation of the workpiece about an axis parallel to the line or zone along which the cutting action takes place.

Rotation is, of course, always about an axis; hence the statement "rotation of the workpiece about an axis" is without a doubt correct, but motion "along an axis" might be more accurately thought of as motion along a path, and especially so in the case of the motion of the workpiece from side-to-side or transversely of the axis or path of feeding motion of the work-carrying table, since this side-to-side motion—at least in the case of the manually controlled version of the invention shown in FIGURES 1 to 5, inclusive—may not be exactly along a straight line but rather along an arcuate path. It should be understood, therefore, that where the terms "first axis" and "second axis" are used herein in reference to the motion of the workpiece, absolutely straight line motion is not required, and that any reasonable deviation therefrom is encompassed.

In the foregoing disclosure, the advantages and significance of this invention to contour cutting machines has been stressed. This is as it should be, but the invention also has significant application to straight-line cutting, especially when it is done with the automatic tracer-controlled band saw. In a band saw, the cutting tool is flexible and sometimes has a tendency to wander to one side or the other of the prescribed cutting path. Since any such tendency would be immediately detected by the sensing element, a corrective and compensating rotational motion would be imparted to the work-carrying turntable to "crab" the workpiece and cause the blade to cut exactly along the prescribed path, whether that path is straight, curved, or otherwise irregular.

What is claimed as our invention is:

1. In a machine tool for performing work along any prescribed path on a workpiece, the combination of:
    (A) carriage means constrained to translatory motion along a first path lying in a plane;
    (B) means on the carriage means to support a workpiece for bodily movement with the carriage means along said first path, while enabling free movement of the workpiece with respect to the carriage means along a second path transversely intersecting the first path and lying in the same plane, as well as rotation of the workpiece with respect to the carriage means and about an axis perpendicular to said plane;
    (C) a tool operating on a fixed axis parallel to the axis about which the workpiece may turn and so located with respect to the carriage means that any part of a workpiece on the carriage means may be brought into engagement with the tool by motion of the carriage means along the first path, motion of the workpiece with respect to the carriage means along the second path, and rotation of the workpiece;
    (D) controllable variable speed reversible power means connected with the carriage means to effect motion thereof along said first path in the direction to engage the workpiece with the tool and produce a known force between the tool and the workpiece and in the opposite direction;
    (E) means connected with the carriage means and connectable with the workpiece operable to rotate the workpiece and by such rotation add to or subtract from said known force between the tool and the workpiece, the freedom of the workpiece to move along the second path enabling the same to freely assume any position required to maintain substantially zero force between the tool and the workpiece along the second path;
    (F) sensing means operatively connected with the tool to be responsive to any changes in force between the tool and the workpiece; and
    (G) control means governed by said sensing means and operatively connected with the power means to regulate the same and cause it to move the carriage means in the direction and at the rate required to maintain the force between the tool and the workpiece along the first path at its known value, so the work can be performed at a constant rate along any contour line by controlling only the rotary motion of the workpiece.

2. In a machine tool for performing work along any prescribed path on a workpiece, the combination of:
    (A) tool-supporting means;
    (B) carriage means;
    (C) means connecting the tool-supporting means and the carriage means for relative motion along a first path which lies in a plane;
    (D) means on the carriage means to support a workpiece for bodily movement with the carriage means along said first path while enabling free movement of the workpiece with respect to the carriage means along a second path transversely intersecting the first path and which lies in the same plane, as well as rotation about an axis perpendicular to said plane;
    (E) a tool to perform the work to be done;
    (F) means mounting the tool on the tool-supporting means in a position fixed with respect thereto and so located with respect to the carriage means that any part of a workpiece on the carriage means may be brought into engagement with the tool by motion of the carriage means along said first path, motion of the workpiece with respect to the carriage means along the second path, and rotation of the workpiece;
    (G) controllable variable speed reversible power means connected with the carriage means to impart motion thereto along said first path in the direction to produce a known force between the tool and the workpiece along the first path, and in the opposite direction;
    (H) means connected with the carriage means and connectable with the workpiece, operable to rotate the workpiece, and by such rotation add to or subtract from the known force between the tool and the workpiece, the freedom of the workpiece to move along the second path enabling the same to freely assume any position required to maintain substantially zero force between the tool and the workpiece along the second path;
    (I) sensing means operatively connected with the tool to be responsive to any changes in force between the tool and the workpiece; and
    (J) control means governed by the sensing means and operatively connected with said power means to regulate the same and cause it to move the carriage means in the direction and at the rate required to maintain the force between the tool and the workpiece along the first path at its known value, so that work can be performed at a constant rate along any contour line by controlling only the rotary motion of the workpiece.

3. In a machine tool, the structural combination of claim 2,
    wherein the tool supporting means is a part of the stationary structure of the machine; and
    wherein the first and second paths are horizontal so that the rotation of the workpiece is always about a vertical axis.

4. The machine tool of claim 3,
    wherein the carriage means is a horizontal table; and
    wherein the means to support the workpiece on the carriage means comprises antifriction means on the table and upon which the workpiece sets.

5. The machine tool of claim 4, wherein the means operable to rotate the workpiece comprises a flexible tension member wrapped around the workpiece and having two stretches thereof extending from the workpiece across the table toward the leading edge thereof, as determined by the direction the table moves to effect engagement between the workpiece and the tool; and means on the table at its leading edge portion connected with said stretches of the tension member to selectively apply tension on one or the other of said stretches.

6. The machine tool of claim 5,
wherein the tool operates on a fixed vertical axis,
wherein the tension member is an endless sprocket chain, and
wherein said means to apply tension on one or the other of its stretches is a sprocket with the chain trained thereover, and
means mounting the sprocket for rotation about an axis fixed with respect to the table and lying in a vertical plane containing the axis on which the tool operates and parallel to said first path, and
means to turn said sprocket.

7. In a contour sawing machine of the type wherein a workpiece is fed against the cutting edge of a saw band with a desired feed force in consequence of translation of a rotatable member in one direction at a predetermined rate, and the workpiece is turned about an axis parallel with the cutting edge of the saw band to enable sawing along curved or irregular lines in consequence of rotation of said rotatable member in one direction or the other, such turning of the workpiece tending to effect an increase in or decrease from the desired feed force depending upon the direction in which the workpiece is turned, characterized by:
 (A) means for rotating said rotatable member;
 (B) controllable power means drivingly connected with said rotatable member and operable to effect translation thereof at varying rates in said one direction and in the opposite direction; and
 (C) control means operatively connected with the power means and having sensing means responsive to changes in reaction forces on the saw band representing departures from the desired feed force which result from turning of the workpiece, to regulate the operation of the power means and effect translation of the rotatable member in the direction and at the rate required to restore the feed force to its desired value, so that by controlling only the rotation of said rotatable member sawing at the correct rate and along any contour line may be effected.

8. In a contour sawing machine of the type having a power driven saw band with flat sides and a cutting edge, mounted to have a downwardly traveling cutting stretch pass through a slot in a movable work-supporting table which is constrained to advance and retract along a path parallel to the flat sides of the saw band and lengthwise of the slot, the improvement which enables the machine to be used for heavy duty work and which is characterized by:
 (A) controllable power means drivingly connected with the table to effect both advance and retraction of the table at varying rates, and operable to effect cutting engagement between a workpiece advancing with the table and the cutting edge of the saw band with a desired feed force;
 (B) means to constrain a workpiece supported by the table to translatory advance with the table for straight line sawing while enabling the workpiece to be moved with respect to the table as required for sawing along curved and irregular lines;
 (C) manually controllable force-applying means operatively connected with the table and connectable with a workpiece supported by the table to turn the workpiece about an axis parallel with the cutting edge of the saw band and thereby provide for guiding the work piece for cutting along curved and irregular lines, such turning of the workpiece tending to add or to subtract from the desired feed force with which the work is pressed against the cutting edge of the band by the power means, depending upon the direction in which the work is turned; and
 (D) control means operatively connected with the power means and having sensing means responsive to changes in reaction forces on the saw band representing departures from the desired feed force, to regulate the operation of the power means so as to cause the table to move in the direction and at the rate required to restore the feed force to its desired value.

9. In a machine tool for performing work along any prescribed path on a workpiece, the combination of:
 (A) a work-supporting structure, comprising
  (1) primary carriage means constrained to translatory motion along a first axis,
  (2) secondary carriage means mounted on the primary carriage means for bodily movement therewith along said first axis and for free movement with respect to the primary carriage means along a second axis transversely intersecting the first axis,
  (3) turret means mounted on the secondary carriage means for rotation about a third axis fixed with respect to the secondary carriage means and perpendicular to the plane defined by the intersecting first and second axes, and
  (4) means on the turret means to hold a workpiece;
 (B) a tool operating on a fixed axis parallel to said third axis and so located with respect to the work-supporting structure that any part of a workpiece on the turret means may be brought into engagement with the tool by motion of the primary carriage means along the first axis, motion of the secondary carriage means with respect to the primary carriage means along the second axis, and rotation of the turret means about the third axis;
 (C) controllable variable speed reversible power means connected with the primary carriage means to effect motion thereof along said first axis in the direction to engage the workpiece with the tool and produce a known force between the tool and the workpiece along said first axis and in the opposite direction;
 (D) controllable and reversible drive means reacting between the turret means and the secondary carriage means to impart rotation to the turret means and a workpiece thereon, about said third axis, and by such rotation add to or subtract from said known force, the freedom of the secondary carriage means to move relative to the primary carriage means along the second axis enabling the workpiece to freely assume any position required to maintain substantially zero force between the workpiece and the tool along the second axis;
 (E) sensing means operatively connected with the tool to be responsive to changes from said known force between the tool and the workpiece which result from rotation of the workpiece with the turret means about said third axis; and
 (F) control means governed by said sensing means and operatively connected with the power means to regulate the same and cause it to move the primary carriage means in the direction and at the rate required to maintain the force between the tool and the workpiece at its known value, so that work can be performed along any contour line and at a constant rate by controlling only the turret drive means.

10. In a machine tool, the structure of claim 9, further characterized by: follower means adapted to follow a templet having delineated thereon the contour of the path along which the work is to be performed; and actuating instrumentalities governed by said follower means and operatively connected with the drive means to cause the same to automatically rotate the turret means as required to perform the desired work.

11. In a machine tool for automatically performing work along any prescribed path, the combination of:
(A) primary carriage means constrained to translatory motion along a first axis;
(B) secondary carriage means mounted on the primary carriage means for bodily movement therewith along said first axis and for free movement with respect to the primary carriage means along a second axis transversely intersecting the first axis;
(C) first turret means mounted on the secondary carriage means for rotation about a third axis fixed with respect to the secondary carriage means and perpendicular to the plane defined by the intersecting first and second axes;
(D) means on said first turret means to hold a workpiece;
(E) second turret means mounted on the secondary carriage means for rotation about an axis parallel to said third axis;
(F) means on the second turret means to hold a templet having delineated thereon the contour of the irregular path along which work is to be performed;
(G) a tool operating upon a fixed axis parallel to said turret axes and so located with respect to said carriage means and work-supporting turret means that any part of the workpiece thereon may be brought into engagement with the tool by motion of the primary carriage means along the first axis, motion of the secondary carriage means with respect to the primary carriage means along the second axis, and rotation of the first turret means about the third axis;
(H) controllable variable speed reversible power means connected with the primary carriage means to effect motion thereof along said first axis, in the direction to engage the workpiece with the tool and produce a known force between the tool and the workpiece along said first axis and in the opposite direction;
(I) controllable and reversible drive means carried by the secondary carriage means and drivingly connected with the turret means to simultaneously rotate both turret means about their respective axes, and by such rotation add to or subtract from the known force between the workpiece and the tool, the freedom of the secondary carriage means to move along the second axis relative to the primary carriage means enabling the workpiece to freely assume any position required to maintain substantially zero force between the workpiece and the tool along the second axis;
(J) sensing means operatively connected with the tool to be responsive to changes from said known force between the tool and the workpiece which results from rotation of the workpiece with the first turret means about said third axis;
(K) control means governed by said sensing means and operatively connected with the power means to regulate the same and cause it to move the primary carriage means in the direction and at the rate required to maintain the force between the tool and the workpiece at its known value, so that work can be performed at a constant rate along any contour line by controlling only the turret drive means;
(L) follower means positioned to coact with a templet on the second turret means; and
(M) actuating instrumentalities governed by said follower means and operatively connected with the turret drive means to automatically cause the same to rotate the turret means as required to perform the desired work.

12. In a band saw having a saw band constrained to travel with its work-performing stretch moving along a fixed vertical path, means by which a workpiece may be automatically fed to said stretch of the saw to cut at a constant rate along any prescribed path, said means being characterized by:
(A) a pair of turrets having vertical axes;
(B) means mounting said turrets for bodily horizontal movement in unison
(1) along a first axis parallel to the faces of the saw band,
(2) along a second axis which is normal to said faces of the saw band, and
(3) for rotation about their vertical axes;
(C) controllable and reversible power means operatively connected with said turret mounting means to move the turrets along the first axis;
(D) means on one of said turrets to hold a workpiece, the work-performing stretch of the saw band passing through said turret so that any portion of a workpiece thereon may be brought into engagement with the toothed edge of the saw band by a proper combination of motions of the work carrying turret;
(E) a templet with the path of the cut to be made delineated thereon, fixed to the other turret;
(F) controllable and reversible drive means connected with the turrets to simultaneously rotate them;
(G) a templet follower arranged to coact with the templet;
(H) actuating instrumentalities governed by the follower and operatively connected with the turret drive means to automatically cause the same to rotate the turrets and thereby rotate the workpiece as required to saw along a path corresponding to the path delineated on the templet; and
(I) means responsive to the effect of rotation of the workpiece upon the saw band and operatively connected with said power means to govern the functioning thereof and thereby assure the maintenance of a uniform feed force between the workpiece and the saw band.

13. In a machine tool, the structure of claim 12, further characterized by:
(A) power assist means operatively connected between the primary and secondary carriage means to impart motion to the secondary carriage means along the second axis and with respect to the primary carriage means; and
(B) sensing means to detect lateral deflection of the work-performing stretch of the saw band and operatively connected with the power assist means to govern the functioning thereof.

14. The method of feeding a workpiece to a cutting tool, such as a band saw or end mill, wherein the cutting action takes place along a fixed, relatively narrow, straight cutting zone, to produce a cut along any prescribed contour line, which method comprises:
(A) by means of a controllable variable speed reversible power source moving the workpiece along a first path which lies in a plane that is normal to the fixed cutting zone in the direction to bring the workpiece into work-performing engagement with the cutting tool and produce a known force between the workpiece and the cutting tool along said first path;
(B) so supporting the workpiece that it may move freely in either direction along a second path which transversely intersects the first axis and likewise lies in a plane that is normal to the fixed cutting zone, so that substantially zero force exists at all times between the workpiece and the tool along said second path;
(C) rotating the workpiece about an axis which is perpendicular to the plane defined by the intersecting first and second paths and hence parallel to the fixed cutting zone, as needed to effect the cutting action along a given contour line;

(D) by such rotation of the workpiece producing a force between the workpiece and the tool along the first path, the effect of which is to either add to or subtract from the known force between the workpiece and the tool along the first path;

(E) sensing any change from the known force between the workpiece and the tool along the first path; and (F) utilizing the sensed changes in the force between the workpiece and the tool along the first path to automatically control the power source and the direction in which it moves the workpiece to maintain the force between the workpiece and the tool along the first path constant so that cutting can be effected at a predetermined constant rate along any contour line by externally controlling only the rotation of the workpiece.

15. The method of claim 14, wherein the control of the rotation of the workpiece is effected manually.

16. The method of claim 14, further characterized by:

(A) providing a templet having the given contour line delineated thereon;

(B) movably supporting the templet;

(C) so connecting the templet with the workpiece that the templet moves with the workpiece with its directions of movement exactly duplicating those of the movement of the workpiece; and (D) by means of a suitable tracer and power unit governed by the tracer, controlling the rotation of the workpiece.

References Cited by the Examiner
UNITED STATES PATENTS

| | | | |
|---|---|---|---|
| 2,296,967 | 9/42 | Wilkie | 83—201 |
| 2,364,969 | 12/44 | Grob et al. | 83—201 |
| 2,933,668 | 4/60 | Brouwer | 250—202 |
| 3,077,132 | 2/63 | Whitmore | 83—201.07 |

ANDREW R. JUHASZ, *Primary Examiner.*